United States Patent
Stanley et al.

(10) Patent No.: US 11,175,725 B2
(45) Date of Patent: Nov. 16, 2021

(54) PRESERVING BATTERY LIFE OF DEVICES THROUGH SHARED PROCESSING TASKS

(71) Applicant: INTERNATIONAL BUSINESS MACHINES CORPORATION, Armonk, NY (US)

(72) Inventors: Katherine Elizabeth Stanley, Hursley (GB); James Russell, Chertsey (GB); Sophie D. Green, Andover (GB); Stephen R. F. Head, Chandler's Ford (GB)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 16/354,901

(22) Filed: Mar. 15, 2019

(65) Prior Publication Data
US 2020/0293103 A1     Sep. 17, 2020

(51) Int. Cl.
*G06F 1/329*     (2019.01)
*G01C 21/20*     (2006.01)
*G01C 21/28*     (2006.01)

(52) U.S. Cl.
CPC .............. *G06F 1/329* (2013.01); *G01C 21/20* (2013.01); *G01C 21/28* (2013.01)

(58) Field of Classification Search
CPC ........ G06F 1/329; G06F 1/325; G06F 1/3206; G01C 21/20; G01C 21/28; Y02D 10/00; G01S 19/39; G01S 19/42; G01S 5/0072
See application file for complete search history.

(56) References Cited

U.S. PATENT DOCUMENTS

| 7,277,049 B2 | 10/2007 | Korneluk et al. |
| 9,392,417 B1 * | 7/2016 | Venkatraman ........ G01S 5/0205 |
| 9,554,239 B2 * | 1/2017 | Swaminathan ......... H04L 67/28 |

(Continued)

FOREIGN PATENT DOCUMENTS

WO     2018049416 A1     3/2018

OTHER PUBLICATIONS

Atul, "[How To] Share GPS on Android Phones—TetherGPS," Tech of Web, Apr. 6, 2011, p. 1-3, https://www.techofweb.com/google/share-gps-android-phones-tethergps.html, Accessed on Mar. 14, 2019.

(Continued)

*Primary Examiner* — Genna M Mott
(74) *Attorney, Agent, or Firm* — Raskesh Roy

(57) ABSTRACT

A method, computer system, and a computer program product for power-efficient location tracking is provided. The present invention may include, storing, by a first device, a first set of location data associated with a first segment mapping of a route, wherein the stored first set of location data is collected according to a group processing task. The present invention may include, receiving, from at least one second device, at least one second set of location data associated with at least one second segment mapping of the route, wherein the received at least one second set of location data is collected according to the group processing task. The present invention may include, mapping, based on combining the first set of collected location data and the received at least one second set of location data, a complete route including the first segment mapping and the at least one second segment mapping.

20 Claims, 5 Drawing Sheets

(56) References Cited

U.S. PATENT DOCUMENTS

| | | | |
|---|---|---|---|
| 10,848,544 B2* | 11/2020 | Pahwa | H04L 67/02 |
| 2009/0079622 A1* | 3/2009 | Seshadri | G01S 19/05 |
| | | | 342/357.42 |
| 2010/0077035 A1 | 3/2010 | Li et al. | |
| 2011/0032146 A1* | 2/2011 | Halivaara | G01S 19/05 |
| | | | 342/357.64 |
| 2012/0079018 A1* | 3/2012 | Rottler | H04W 4/023 |
| | | | 709/204 |
| 2013/0244686 A1 | 9/2013 | Saha et al. | |
| 2015/0004958 A1* | 1/2015 | Wang | H04W 4/08 |
| | | | 455/418 |
| 2016/0262103 A1 | 9/2016 | Sen et al. | |
| 2016/0353241 A1* | 12/2016 | Venkataramani | H04W 40/005 |
| 2017/0223508 A1* | 8/2017 | Gordon | G06F 1/325 |
| 2018/0063782 A1 | 3/2018 | Ekambaram et al. | |
| 2018/0077674 A1 | 3/2018 | Pagonis et al. | |
| 2019/0281408 A1* | 9/2019 | Zhao | H04W 4/021 |

OTHER PUBLICATIONS

Gpsgate, "Sharing GPS Data Over a Network and Between Computers," GpsGate, p. 1-2, https://gpsgate.com/support/sharing_gps_data_over_a_network_and_between_computers, Accessed on Mar. 14, 2019.

Jillybunch, "Share GPS," Apps on Google Play, Last Updated Aug. 12, 2016, p. 1-4, https://play.google.com/store/apps/details?id=com.jillybunch.shareGPS, Accessed on Mar. 14, 2019.

Mell et al., "The NIST Definition of Cloud Computing," National Institute of Standards and Technology, Sep. 2011, p. 1-3, Special Publication 800-145.

NGINX, "What Is Round-Robin Load Balancing?," NGINX Resources, p. 1-2, https://www.nginx.com/resources/glossary/round-robin-load-balancing/, Accessed on Mar. 14, 2019.

Wikipedia, "Time-Sharing," Wikipedia: the Free Encyclopedia, Last Edited on Jan. 21, 2019, p. 1-9, https://en.wikipedia.org/wiki/Time-sharing, Accessed on Mar. 14, 2019.

* cited by examiner

PRESERVING BATTERY LIFE OF DEVICES THROUGH SHARED PROCESSING TASKS

BACKGROUND

The present invention relates generally to the field of computing, and more particularly to power management.

Many devices today are capable of receiving data from Global Positioning System (GPS) satellites for geolocation and navigation. However, the battery life of such a device may be depleted in proportion to how frequently the global position of the device is calculated. Preserving the battery life of the device through less frequent calculations of the global position may produce an unreliable GPS trail for navigation.

SUMMARY

Embodiments of the present invention disclose a method, computer system, and a computer program product for power-efficient location tracking. The present invention may include, storing, by a first device, a first set of location data associated with a first segment mapping of a route, wherein the stored first set of location data is collected according to a group processing task. The present invention may include, receiving, from at least one second device, at least one second set of location data associated with at least one second segment mapping of the route, wherein the received at least one second set of location data is collected according to the group processing task. The present invention may include, mapping, based on combining the first set of collected location data and the received at least one second set of location data, a complete route including the first segment mapping and the at least one second segment mapping.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
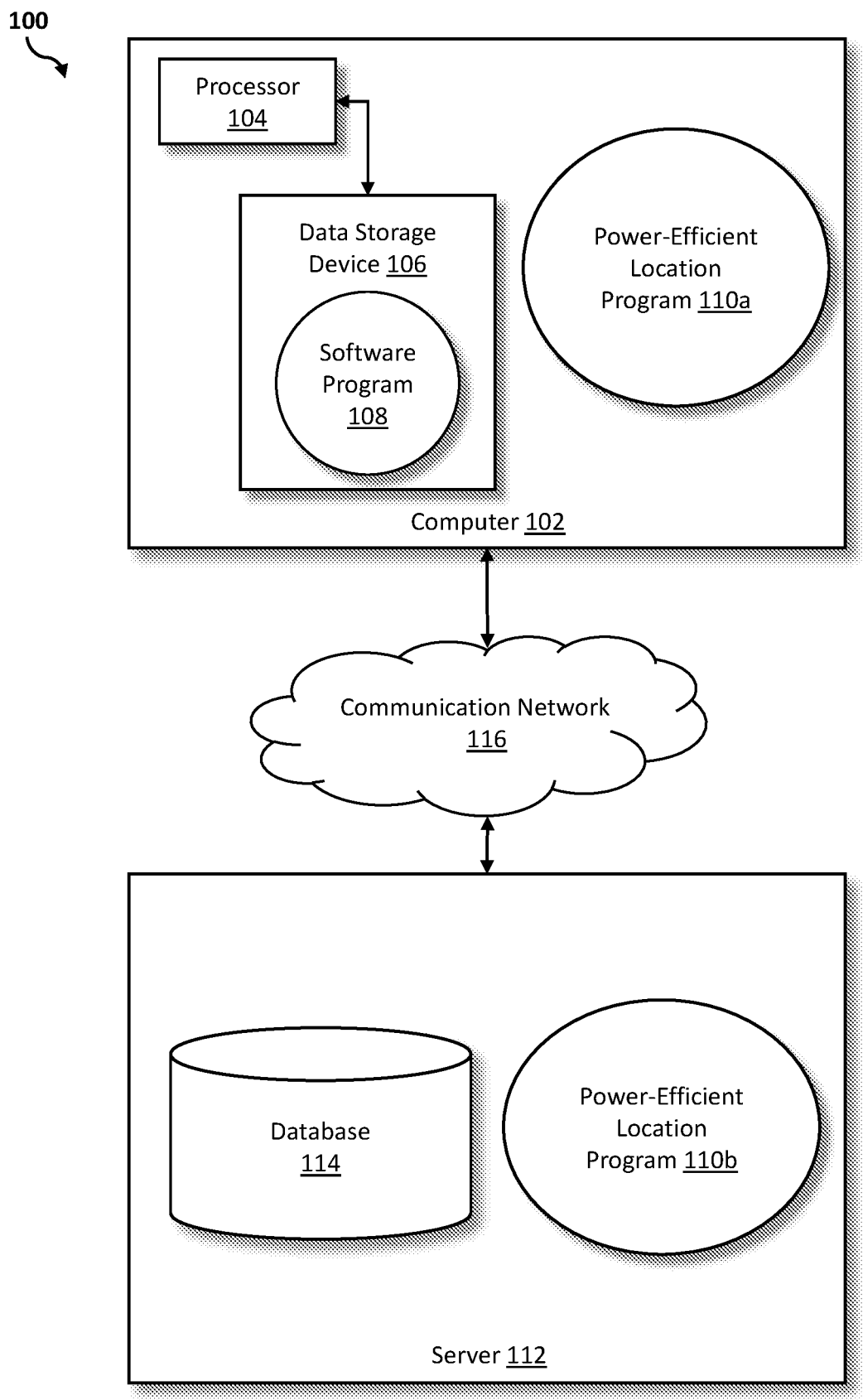
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for low-powered GPS tracking and navigation. As such, the present embodiment has the capacity to improve the technical field of power management by reducing power consuming in individual GPS-enabled devices ("GPS device") by sharing processing tasks, associated with GPS tracking, between multiple GPS devices in a group. More specifically, a power-efficient location program may be implemented into an operating system of a GPS device and/or incorporated into a GPS application running on the GPS device. The power-efficient location program may enable a first GPS device to detect other GPS devices, running the power-efficient location program, in proximity of the first GPS device. Then, the power-efficient location program may coordinate, between each GPS device in the group, out-of-synchronization (i.e., out-of-sync) GPS polling to retrieve GPS data. Thereafter, the power-efficient location program may cause the GPS devices in the group to share and combine the GPS data in order to perform GPS tracking.

As described previously, many devices today are capable of receiving data from GPS satellites for geolocation and navigation. However, the battery life of such a device may be depleted in proportion to how frequently the global position of the device is calculated. Preserving the battery life of the device through less frequent calculations of the global position may produce an unreliable GPS trail for navigation. In some navigation instances, jagged and unreliable GPS tracking may be dangerous to users.

Existing GPS methods try to reduce power consumption by taking a GPS position of a vehicle and predicting where the vehicle will travel for short periods of time. However, such GPS methods only provide a slight increase in battery life. In addition, such GPS methods may provide less accurate GPS trails as the vehicle may take turns or change speed between successive GPS polls.

Therefore, it may be advantageous to, among other things, provide a way to conserve the battery life of a GPS device while facilitating GPS accuracy.

According to at least one embodiment, the power-efficient location program may enable two or more GPS devices, traveling together, to perform GPS polling out-of-sync with each other and share GPS data to generate a rich GPS trail. As such, each GPS device may reduce the number of GPS polls and may replace the missing GPS data with GPS data shared by other GPS devices nearby. In one embodiment, the GPS polling interval of each GPS device may be divided by the number of GPS devices in a group. In other words, each GPS device may only need to poll 1/(number of GPS devices together) times the initial GPS polling interval of a single GPS device. For example, if each GPS device is performing GPS polling once every second, five GPS devices traveling together may perform GPS polling once every five seconds.

According to at least one embodiment, the power-efficient location program may dynamically connect multiple devices to actively provide GPS data in order to share the processing task of GPS polling. The power-efficient location program may provide a predetermined GPS polling interval for the GPS device which may be configured by the user based on the user preference of GPS accuracy over power efficiency or vise versa. The power-efficient location program may enable the GPS device to store the GPS data and combine the GPS data from the group to generate a complete navigation route once GPS poll sharing has ended. The power-efficient location program may identify when other GPS devices are no longer in range for sharing GPS polling and may increase the GPS polling interval to the original GPS polling interval in order to maintain GPS tracking accuracy.

According to at least one embodiment, the power-efficient location program may dynamically configure the GPS polling intervals of multiple GPS devices, in a coordinated way, based on the required GPS tracking accuracy of all the GPS devices in the group. As such, multiple GPS devices in the group may perform GPS polling at varying intervals according to the GPS tracking accuracy/power efficiency needs of the respective GPS devices.

According to at least one embodiment, the power-efficient location program may enable a group of GPS devices to share processing tasks relating to GPS location data. In one embodiment, the power-efficient location program may include a scheduler component which may determine when each GPS device should poll for GPS data. In another embodiment, the power-efficient location program may include a sharing component which may enable the GPS data to be available to all the GPS devices in the group. In at least one embodiment, the power-efficient location program may include a combining component which may enable combining the GPS data received from the group with the GPS data stored in the GPS device.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a power-efficient location program 110a. The networked computer environment 100 may also include a server 112 that is enabled to run a power-efficient location program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the power-efficient location program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the power-efficient location program 110a, 110b (respectively) to perform accurate location or GPS tracking while conserving the battery life of the GPS device (e.g., client computer 102). The power-efficient location tracking method is explained in more detail below with respect to FIG. 2.

Figure 2:
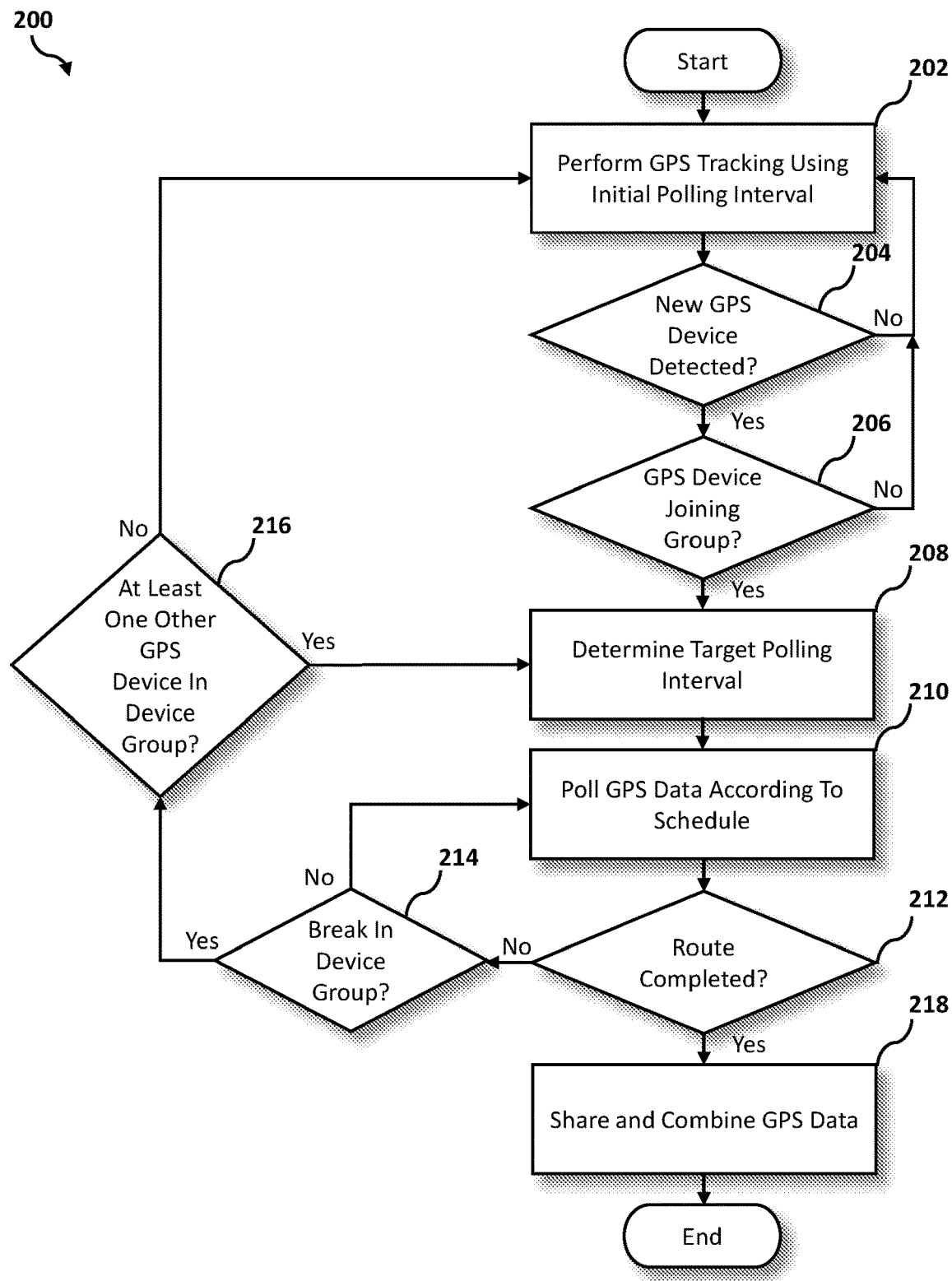
FIG. 2 is an operational flowchart illustrating a process for power-efficient location tracking according to at least one embodiment.

Referring now to FIG. 2, an operational flowchart illustrating the exemplary power-efficient location tracking process 200 used by the power-efficient location program 110a, 110b according to at least one embodiment is depicted.

At 202, GPS tracking is performed using an initial polling interval. The power-efficient location program 110a, 110b may be implemented into an operating system of a user device, such as, a GPS device (e.g., client computer 102) and/or incorporated into a GPS application running on the user device.

In response to receiving a user command by the power-efficient location program 110a, 110b (e.g., via interactions with a user interface (UI)) associated with initiating a processing task for performing GPS tracking, the power-efficient location program 110a, 110b may cause the GPS device to begin GPS polling, e.g., polling for GPS data, at an initial polling interval (e.g., time interval measured in seconds). According to one embodiment, polling for GPS data may include the GPS device communicating with GPS satellites to collect location (e.g., geolocation) data associated with a position of the GPS device. As such, the GPS accuracy may increase with the frequency of the polling interval.

The power-efficient location program 110a, 110b may provide the user with one or more options for an accuracy measure associated with the GPS polling (e.g., GPS accuracy criterion). In one embodiment, the options for the GPS accuracy criterion may be included in user preferences settings of the power-efficient location program 110a, 110b. For instance, the power-efficient location program 110a, 110b may provide GPS accuracy criterion options for best GPS accuracy, good GPS accuracy, ok GPS accuracy, and GPS turned off. In other instances, the power-efficient location program 110a, 110b may provide more fine-tuned GPS accuracy criterion options (e.g., a range of 10 GPS accuracy options where option 1 may be associated with the best GPS accuracy and option 10 may be associated with turning off the GPS tracking). In still other instances, the power-efficient location program 110a, 110b may provide less fine-tuned GPS accuracy criterion options (e.g., GPS on and GPS off). Each GPS accuracy criterion may be associated with a target polling interval or polling interval for the individual GPS device (e.g., retrieving a GPS data every one second for best GPS accuracy) and estimated power consumption/battery life (e.g., 20-hour battery life during the best GPS accuracy polling interval) of the GPS device.

According to one embodiment, the power-efficient location program 110a, 110b may set a default option for GPS accuracy criterion and may dynamically alter the GPS accuracy criterion based on the remaining battery life of the GPS device (e.g., decrease GPS accuracy to conserve battery life). In other embodiments, the power-efficient location program 110a, 110b may set a user-defined GPS accuracy criterion in response to receiving a user selection for the GPS accuracy criterion. The initial polling interval may include the target polling interval for the individual GPS device associated with the selected GPS accuracy criterion (e.g., default GPS accuracy option or user-defined GPS accuracy option).

Consider the following example, a user A1 is cycling a 50-mile bike trail. User A1 interacts with the power-efficient location program 110a, 110b running on a GPS device A and instructs the power-efficient location program 110a, 110b to perform GPS tracking during the 50-mile bike trail. User A1 interacts with the user preferences settings of the power-efficient location program 110a, 110b and selects option 1 associated with the best GPS accuracy criterion having a target polling interval of every one second. In response, the power-efficient location program 110a, 110b causes the GPS device A to perform GPS tracking, initially polling for GPS data every one second.

Then at 204, the power-efficient location program 110a, 110b determines if a new GPS device is detected. According to one embodiment, the power-efficient location program 110a, 110b running on the GPS device (e.g., first GPS device) may seek to connect with at least one second device (e.g., additional GPS devices) in order to form a device group for sharing one or more group processing tasks associated with GPS tracking. In one embodiment, the power-efficient location program 110a, 110b running on the first GPS device may request permission (e.g., via UI dialog box) from the user (e.g., first user) to interact with at least one additional GPS device to share and receive GPS data for the group processing task of GPS tracking. In response to receiving the requested permission from the user (e.g., user selecting "Permission Granted" button in the UI dialog box) of the first GPS device, the power-efficient location program 110a, 110b may cause the first GPS device to search for additional GPS devices in proximity of the first GPS device. In one embodiment, the power-efficient location program 110a, 110b running on the first GPS device may search for additional GPS devices using low-energy wireless communications (e.g., communication network 116). In at least one embodiment, the power-efficient location program 110a, 110b may engage a Bluetooth® (Bluetooth and all Bluetooth-based trademarks and logos are trademarks or registered trademarks of Bluetooth SIG, Inc. and/or its affiliates) component of the first GPS device to search for additional GPS devices using, for example, a Bluetooth® Low Energy (BLE) protocol. BLE may enable the first GPS device to find additional GPS devices within a range of approximately ten meters. In one embodiment, after one additional GPS device is detected, the first GPS device and the additional GPS device may be chained to effectively increase the BLE range (e.g., 20 meters) for detecting additional GPS devices. In at least one embodiment, after detecting the new device, the power-efficient location program 110a, 110b may transmit a query from the first GPS device to the new detected device, using BLE, to determine if the new device is using GPS or is GPS-enabled (e.g., GPS device).

If the power-efficient location program 110a, 110b does not detect a new GPS device at 204 (e.g., "No" branch), then the power-efficient location program 110a, 110b returns to 202 to perform GPS tracking using the initial polling interval of the first GPS device.

Continuing with the previous example, user A1 interacts with the UI of the power-efficient location program 110a, 110b running on GPS device A to grant permission to the power-efficient location program 110a, 110b to share and receive GPS data with additional GPS devices for the task of GPS tracking. The power-efficient location program 110a, 110b engages the Bluetooth® component of GPS device A to search for additional GPS devices within ten meters of GPS device A. However, because user A1 is initially cycling on the bike trail alone, the GPS device A is unable to locate other devices and continues to perform GPS tracking using the initial one second polling interval.

However, if the power-efficient location program 110a, 110b does detect a new GPS device at 204 (e.g., "Yes" branch), then the power-efficient location program 110a, 110b determines if the detected GPS device is joining the group at 206. In one embodiment, the power-efficient location program 110a, 110b may transmit, from the first GPS device to the at least one second GPS device (e.g., detected new GPS device), a request (e.g., via communication network 116) to join the first GPS device (e.g., form a device group) and allow data transmission and coordination between the first and second GPS devices for GPS tracking. In response to the received request, the at least one second GPS device may generate and display the received request (e.g., via UI dialog box) to alert the user of the at least one second GPS device and enable the user to respond to the received request from the first GPS device. In at least one embodiment, the power-efficient location program 110a, 110b may continue to detect new GPS devices throughout the power-efficient location tracking process and determine if they will join the existing group.

If the power-efficient location program 110a, 110b does detect the new GPS device at 204 (e.g., "Yes" branch) and also determines that the detected GPS device is not joining the group at 206 (e.g., "No" branch), then the power-efficient location program 110a, 110b returns to 202 to perform GPS tracking using the initial polling interval of the first GPS device. In one embodiment, the detected new GPS device may transmit a rejection response back to the first GPS device (e.g., via communication network 116) indicating that the detected new GPS device will not be joining the device group, in response to the user's (of the detected new GPS device) interaction with the UI dialog box displaying the received request from the first GPS device. In one embodiment, after the detected new GPS device declines to join the device group, the power-efficient location program 110a, 110b may register the detected GPS device in an ignore list to prevent further requests from being transmitted to the detected GPS device. In another embodiment, after the detected new GPS device declines to join the device group, the power-efficient location program 110a, 110b may implement a cool down period (which may be defined by the user) before another request to join the device group may be sent to the detected GPS device.

However, if the power-efficient location program 110a, 110b does detect the new GPS device at 204 (e.g., "Yes" branch) and also determines that the detected GPS device is joining the group at 206 (e.g., "Yes" branch), then the power-efficient location program 110a, 110b determines the target polling interval at 208. In response to receiving the requested permission (e.g., user of the detected GPS device selecting "Permission Granted" button in the UI dialog box) from the detected GPS device (e.g., second GPS device), the power-efficient location program 110a, 110b running on each GPS device (e.g., first and second GPS device) may initialize a wireless personal area network (WPAN) to facilitate data transmission and coordination (e.g., via BLE) within the device group.

In one embodiment, the power-efficient location program 110a, 110b running on each GPS device may include a scheduler component. The scheduler component may access the user preferences settings to look up an individual criterion, such as the target polling interval set for each GPS device. The target polling interval may be associated with the GPS accuracy criterion selected by the user of the GPS device or set by default by the power-efficient location program 110a, 110b running on the GPS device. In one embodiment, the target polling interval may be associated with the polling interval for the individual GPS device performing GPS tracking.

Continuing with the previous example, users B1 and C1 join user A1 while cycling on the 50-mile bike trail. GPS device A of user A1 detects, via BLE, a GPS device B associated with user B1 and a GPS device C associated with user C1. The power-efficient location program 110a, 110b running on GPS device A transmits a request, via UI dialog box, to GPS device B and GPS device C to join GPS device A in a device group and allow coordination between the GPS devices for GPS tracking. In response to user B1 and user C 1 selecting the "Permission Granted" button in the UI dialog box of GPS device B and GPS device C, respectively, the power-efficient location program 110a, 110b running on each GPS device A, B, and C initiates coordination for GPS tracking. Then, the scheduler component of the power-efficient location program 110a, 110b running on each GPS device A, B, and C looks up the respective target polling interval of each GPS device A, B, and C.

Then, at 210, GPS data is polled according to a schedule. The power-efficient location program 110a, 110b may establish a polling schedule for the group processing task such that each GPS device may poll less frequently, as compared to the target polling interval of the respective GPS device, in order to conserve battery life. The power-efficient location program 110a, 110b may enable each GPS device to replace the remaining location data or GPS data (e.g., location data missed as a result of polling less frequently) with GPS data shared by the device group. In one embodiment, the scheduler component of the power-efficient location program 110a, 110b running on each GPS device may share (e.g., via communication network 116) the respective target polling intervals and may agree on a polling schedule synchronized across the device group. In one embodiment, the polling schedule may include out-of-phase polling such that only one GPS device may poll at a given interval (e.g., time interval).

According to one embodiment, the scheduler component may determine that the target polling interval of each GPS device is the same. As such, the scheduler component may establish a polling schedule where the group processing task (e.g., polling for GPS data) is distributed evenly between the number of GPS devices. In such instances, each GPS device may poll 1/(number of GPS devices) times the target polling interval of each GPS device. The scheduler component may cause the respective GPS device to communicate (e.g., via communication network 116) with one or more GPS satellites to collect location data (e.g., geolocation data associated with a position of the GPS device) at scheduled intervals (e.g., time intervals) set by the polling schedule for the device group. Each GPS device may collect, and store, location data associated with mapping a segment of a route (e.g., running path, cycling trail).

Continuing with the previous example, the scheduler component of the power-efficient location program 110a, 110b running on each GPS device A, B, and C looks up the respective target polling interval of each GPS device A, B, and C and shares the respective target polling intervals with the device group. The scheduler component determines that the target polling intervals of each GPS device A, B, and C are the same; one GPS data point per second, as shown in Table 1A, below.

TABLE 1A

| | \multicolumn{10}{c}{Time} |
|---|---|---|---|---|---|---|---|---|---|---|
| | 1 | 2 | 3 | 4 | 5 | 6 | 7 | 8 | 9 | 10 |
| A, B, C | o | o | o | o | o | o | o | o | o | o |

Since each GPS device A, B, and C includes the same target polling interval, the scheduler component establishes a polling schedule where the group polling task is distributed evenly between the GPS devices A, B, and C, as shown in Table 1B below.

TABLE 1B

| | Time | | | | | | | | | |
|---|---|---|---|---|---|---|---|---|---|---|
| | 1 | 2 | 3 | 4 | 5 | 6 | 7 | 8 | 9 | 10 |
| A | | | o | | | o | | | o | |
| B | | o | | | o | | | o | | |
| C | o | | | o | | | o | | | o |

As shown in Table 1B, rather than each GPS device A, B, and C polling for GPS data every second (as required by the target polling interval shown in Table 1A), the scheduler component coordinates an out-of-phase polling schedule for the device group. Specifically, GPS device A is scheduled to poll for GPS data on seconds 3, 6, and 9 (every three seconds), GPS device B is scheduled to poll for GPS data on seconds 2, 5, and 8 (every three seconds), and GPS device C is scheduled to poll for GPS data on seconds 1, 4, 7, and 10 (every three seconds). Based on the polling schedule shown in Table 1B, GPS devices A, B, and C are each scheduled to poll ⅓ as often as the respective target polling intervals.

According to another embodiment, the scheduler component may determine that the target polling intervals of the GPS devices are not the same. The target polling interval may vary across each GPS device in the device group based on user preferences and/or the remaining battery life of the respective GPS device. As such, the scheduler component may establish a polling schedule where the group processing task (e.g., polling for GPS data) may be unevenly distributed across the GPS devices in the device group according to the target polling interval needs of each GPS device. In one embodiment, the power-efficient location program 110a, 110b may enable the scheduler component to dynamically change, e.g., configure/reconfigure, the polling schedule of multiple GPS devices in a coordinated way based on the number of GPS devices in the device group, the required GPS accuracy criterion (e.g., target polling interval) of all the GPS devices in the device group, and the battery life criterion of all the GPS devices in the device group.

Then, the scheduler component may engage the respective GPS device to communicate (e.g., via communication network 116) with one or more GPS satellites to collect location data (e.g., geolocation data associated with a position of the GPS device) at scheduled intervals (e.g., time intervals) set by the polling schedule for the device group.

Continuing with the previous example, in order to conserve the remaining battery life of GPS device B, the power-efficient location program 110a, 110b running on GPS device B alters the target polling interval of GPS device B from one GPS data point every second to one GPS data point every two seconds. The power-efficient location program 110a, 110b running on GPS device C similarly alters the target polling interval of GPS device C from one GPS data point every second to one GPS data point every two seconds.

The scheduler component of the power-efficient location program 110a, 110b running on GPS device B and GPS device C detects the altered target polling intervals and communicates the changes, via BLE, with the device group. The scheduler component determines that the target polling intervals of GPS devices A, B, and C are no longer the same. As shown in Table 2A below, the scheduler component determines, based on looking up the respective target polling intervals, that GPS device A still needs one GPS data point per second, but GPS device B and GPS device C now need one GPS data point every two seconds.

TABLE 2A

| | Time | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| A | o | o | o | o | o | o | o | o | o | o | o | o |
| B, C | | o | | o | | o | | o | | o | | o |

The power-efficient location program 110a, 110b enables the scheduler component to dynamically change the polling schedule from the polling schedule shown in Table 1B to the polling schedule shown in Table 2B, where the polling task is unevenly distributed across GPS devices A, B, and C.

TABLE 2B

| | Time | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| A | | o | o | | o | o | | o | o | | o | o |
| B | | | | o | | | | | | o | | |
| C | o | | | | | | o | | | | | |

As shown in Table 2B, the polling task is unevenly distributed across the GPS devices A, B, and C in a coordinated (e.g., synced and out-of-phase) way based on the target polling interval needs of all the GPS devices A, B, and C in the device group. Specifically, rather than GPS device A polling for GPS data every second (as indicated by the target polling interval shown in Table 2A), the scheduler component coordinates a polling schedule where GPS device A is scheduled to poll for GPS data on seconds 2, 3, 5, 6, 8, 9, 11, and 12. Further, rather than GPS device B polling for GPS data every two seconds (as indicated by the altered target polling interval shown in Table 2A), the scheduler component coordinates a polling schedule where GPS device B is scheduled to poll for GPS data on seconds 4 and 10. Similarly, rather than GPS device C polling for GPS data every two seconds (as indicated by the altered target polling interval shown in Table 2A), the scheduler component coordinates a polling schedule where GPS device C is scheduled to poll for GPS data on seconds 1 and 7. Based on the polling schedule shown in Table 2B, GPS device A is scheduled to poll ⅔ as often as the target polling interval of GPS device A and GPS devices B and C are each scheduled to poll ⅓ as often as the target polling intervals of GPS devices B and C.

Then, at 212, the power-efficient location program 110a, 110b determines if a route is completed. In one embodiment, the power-efficient location program 110a, 110b may provide an option in the UI (e.g., "Route Completed" button) which the user may select to indicate that the route for GPS tracking is completed. In another embodiment, the power-efficient location program 110a, 110b may detect (e.g., via interacting with an accelerometer of the GPS device) when the GPS device has stopped moving and may provide a UI prompt (e.g., "Route Completed?" prompt) to determine if the route for GPS tracking is completed.

If the power-efficient location program 110a, 110b determines that the route is not completed at 212 (e.g., "No" branch), then the power-efficient location program 110a, 110b performs another query to determine if a break in the device group is detected at 214. The power-efficient location program 110a, 110b may continue performing GPS tracking as long as the user does not indicate (e.g., via selecting the associated option in the UI) that the route for GPS tracking is completed. In one embodiment, while performing GPS tracking, the power-efficient location program 110a, 110b may detect if any of the GPS devices in the device group drop out of the device group based on identifying a weakening and/or breakage in the BLE link between the GPS devices.

If the power-efficient location program 110a, 110b determines that the route is not completed at 212 (e.g., "No" branch) and also determines that there is no break in the device group at 214 (e.g., "No" branch), then the power-efficient location program 110a, 110b returns to poll for GPS data according to the schedule as described at 210.

Continuing with the previous example, users A1, B1, and C1 continue cycling along the 50-mile bike trail. The power-efficient location program 110a, 110b running on each of the GPS devices A, B, and C determines that the route is not completed because none of the users A1, B1, and C1 interact with the UI of the respective GPS devices A, B, and C to indicate that the route is completed. Further, the power-efficient location program 110a, 110b running on each of the GPS devices A, B, and C does not detect a weakening and/or breakage in the BLE link between the GPS devices A, B, and C. As such, each GPS device A, B, and C continue to poll for GPS data according to the polling schedule set by the scheduling component.

However, if the power-efficient location program 110a, 110b determines that the route is not completed at 212 (e.g., "No" branch) and also determines that there is a link break in the device group at 214 (e.g., "Yes" branch), then the power-efficient location program 110a, 110b performs another query at 216 to determine if at least one other GPS device is in the device group. In one embodiment, the power-efficient location program 110a, 110b may determine the number of GPS devices remaining in the device group based on detecting the BLE links between the GPS devices.

Continuing with the previous example, users A1 and B1 continue cycling along the 50-mile bike trail while user C1 diverts to a different bike trail. The power-efficient location program 110a, 110b running on each of the GPS devices A and B detects a breakage in the BLE link with the GPS device C as the user C1 cycles out of range of the GPS devices A and B.

If the power-efficient location program 110a, 110b determines that there is a break in the device group at 214 (e.g., "Yes" branch) and also determines that at least one other GPS device is in the device group at 216 (e.g., "Yes" branch), then the power-efficient location program 110a, 110b returns to 208 to determine the target polling interval, as previously described at 208. In one embodiment, the scheduling component of the power-efficient location program 110a, 110b running on the remaining GPS devices may look up and share the respective target polling intervals with the device group, as previously described at 208. Then, the power-efficient location program 110a, 110b may enable the scheduler component to dynamically change, e.g., configure/reconfigure, the polling schedule of the remaining GPS devices in a coordinated way based on the required GPS accuracy (e.g., target polling interval) and battery life of the remaining GPS devices in the device group, as previously described at 210. In at least one embodiment, the polling interval of the remaining GPS devices in the device group may increase to maintain the accuracy of the GPS tracking after one or more GPS devices have dropped out of the device group.

Continuing with the previous example, the power-efficient location program 110a, 110b running on each of the GPS devices A and B determines, via detecting the BLE link, that at least one other GPS device is in the device group. Then, the scheduler component of the power-efficient location program 110a, 110b running on each GPS device A and B looks up the respective target polling interval of each GPS device A and B and shares the respective target polling intervals with the device group, as described previously with reference to the example at 208. Thereafter, the power-efficient location program 110a, 110b enables the scheduler component to dynamically change the polling schedule of the remaining GPS devices A and B in a coordinated way to account for GPS device C dropping out of the device group, as well as the target polling interval and battery life of GPS devices A and B.

However, if the power-efficient location program 110a, 110b determines that there is a break in the device group at 214 (e.g., "Yes" branch) and further determines that at least one other GPS device is not in the device group at 216 (e.g., "No" branch), then the power-efficient location program 110a, 110b returns to 202 to perform GPS tracking using the initial polling interval of the first GPS device.

Continuing with the previous example, user A1 continues cycling along the 50-mile bike trail while user B1 diverts to another different bike trail. The power-efficient location program 110a, 110b running on GPS device A detects a breakage in the BLE link with the GPS device B as the user B1 cycles out of range of the GPS device A. Thereafter, the power-efficient location program 110a, 110b running on GPS device A detects no other GPS device in the BLE range of the GPS device A and ramps up the polling interval of GPS device A to the initial polling interval for the remaining route of the 50-mile bike trail.

However, if the power-efficient location program 110a, 110b determines that the route is completed at 212 (e.g., "Yes" branch), then GPS data is shared and combined at 218. Each GPS device may store the GPS data (e.g., polled according to scheduling component) locally, in the data storage device 106 of the GPS device and/or remotely, in the database 114 of the server 112 or other cloud storage.

In one embodiment, the power-efficient location program 110a, 110b running on each GPS device may include a sharing component. Once the power-efficient location program 110a, 110b determines that the route is completed, the sharing component may enable each GPS device to share the stored location data (e.g., GPS data) associated with a segment of the route with the other GPS devices in the device group. In one embodiment, the sharing component may engage the Bluetooth® component of the respective GPS device and may share the GPS data using BLE protocol. Any additional battery usage in the GPS device from BLE data transmission may be outweighed by the battery savings in the GPS device from less frequent polling for GPS data.

In one embodiment, the power-efficient location program 110a, 110b running on each GPS device may include a combining component. The combining component may enable each GPS device to combine the location data received from the other GPS devices (e.g., the other GPS devices sharing the location data) in the device group with the stored location data in each GPS device. As such, the combining component may generate a map of the complete route including the location data associated with the segments of the route received from the GPS devices in the device group. In one embodiment, the power-efficient location program 110a, 110b running on each GPS device may provide a full GPS trail of the completed route in each GPS device by replacing the missing GPS data in each GPS device with GPS data shared by the other GPS devices in the device group (e.g., combining different segments of the trail).

Continuing with the example shown in Table 1B, at the end of the 50-mile bike trail, users A1, B1, and C1 interact with the UI of the respective GPS devices A, B, and C to indicate that the route is completed. The sharing component of GPS device A shares, via BLE, the GPS data for seconds 3, 6, and 9 with GPS device B and GPS device C. Further, the sharing component of GPS device B shares, via BLE, the GPS data for seconds 2, 5, and 8 with GPS device A and GPS device C. Similarly, the sharing component of GPS device C shares, via BLE, the GPS data for seconds 1, 4, 7, and 10 with GPS device A and GPS device B. In this manner, the sharing components of GPS devices A, B, and C share the GPS data for the remaining segments of the 50-mile bike trail.

Thereafter, the combining component of GPS device A combines the GPS data received from GPS device B and GPS device C with the GPS data polled by GPS device A to generate a full GPS trail for seconds 1 through 10. Further, the combining component of GPS device B combines the GPS data received from GPS device A and GPS device C with the GPS data polled by GPS device B to generate a full GPS trail for seconds 1 through 10. Similarly, the combining component of GPS device C combines the GPS data received from GPS device A and GPS device B with the GPS data polled by GPS device C to generate a full GPS trail for seconds 1 through 10. In this manner, the combining components of GPS devices A, B, and C combine the GPS data to generate a map of the complete 50-mile bike trail.

The functionality of a computer may be improved by the power-efficient location program 110a, 110b because the computer may consume less power (e.g., battery life) by sharing the processing tasks associated with GPS tracking, which typically includes power intensive processing tasks. By implementing the power-efficient location program 110a, 110b, a computer including a portable battery having a limited battery life may automatically coordinate with other devices to provide the user with accurate location data and GPS tracking for a longer period of time relative to the computer individually performing GPS tracking.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
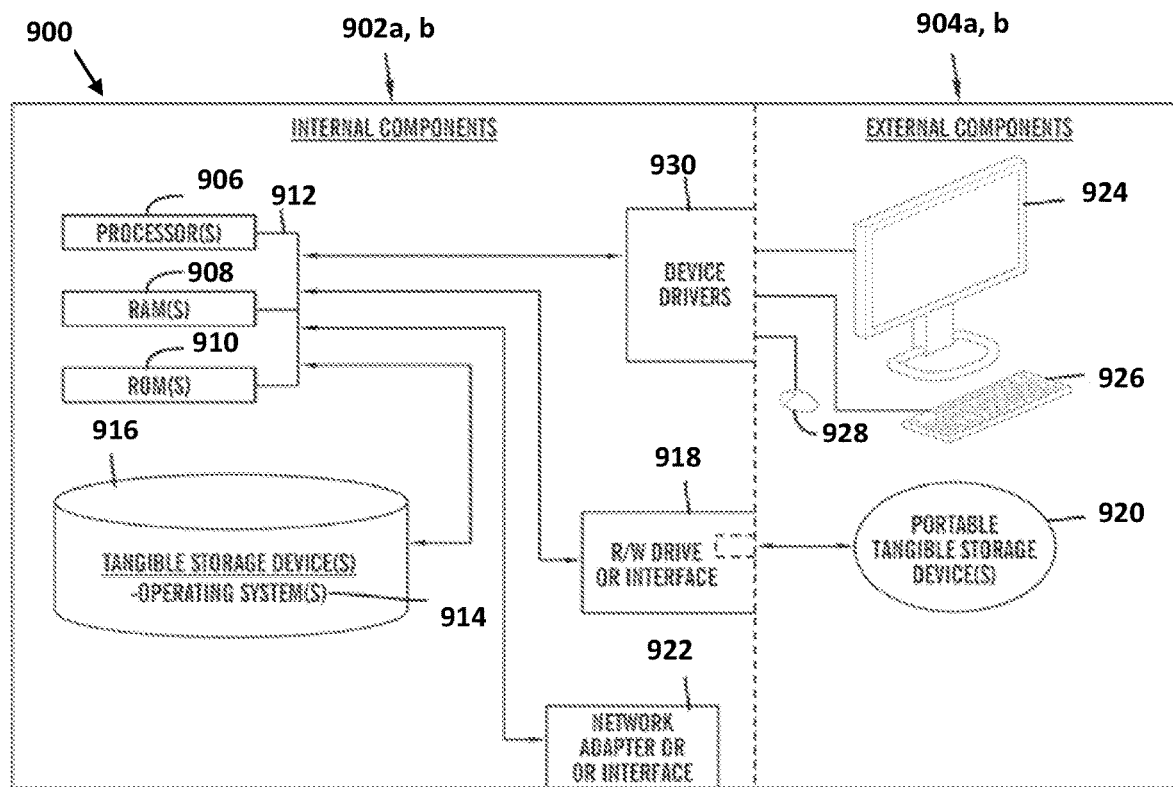
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the power-efficient location program 110a in client computer 102, and the power-efficient location program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the power-efficient location program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the power-efficient location program 110a in client computer 102 and the power-efficient location program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the power-efficient location program 110a in client computer 102 and the power-efficient location program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
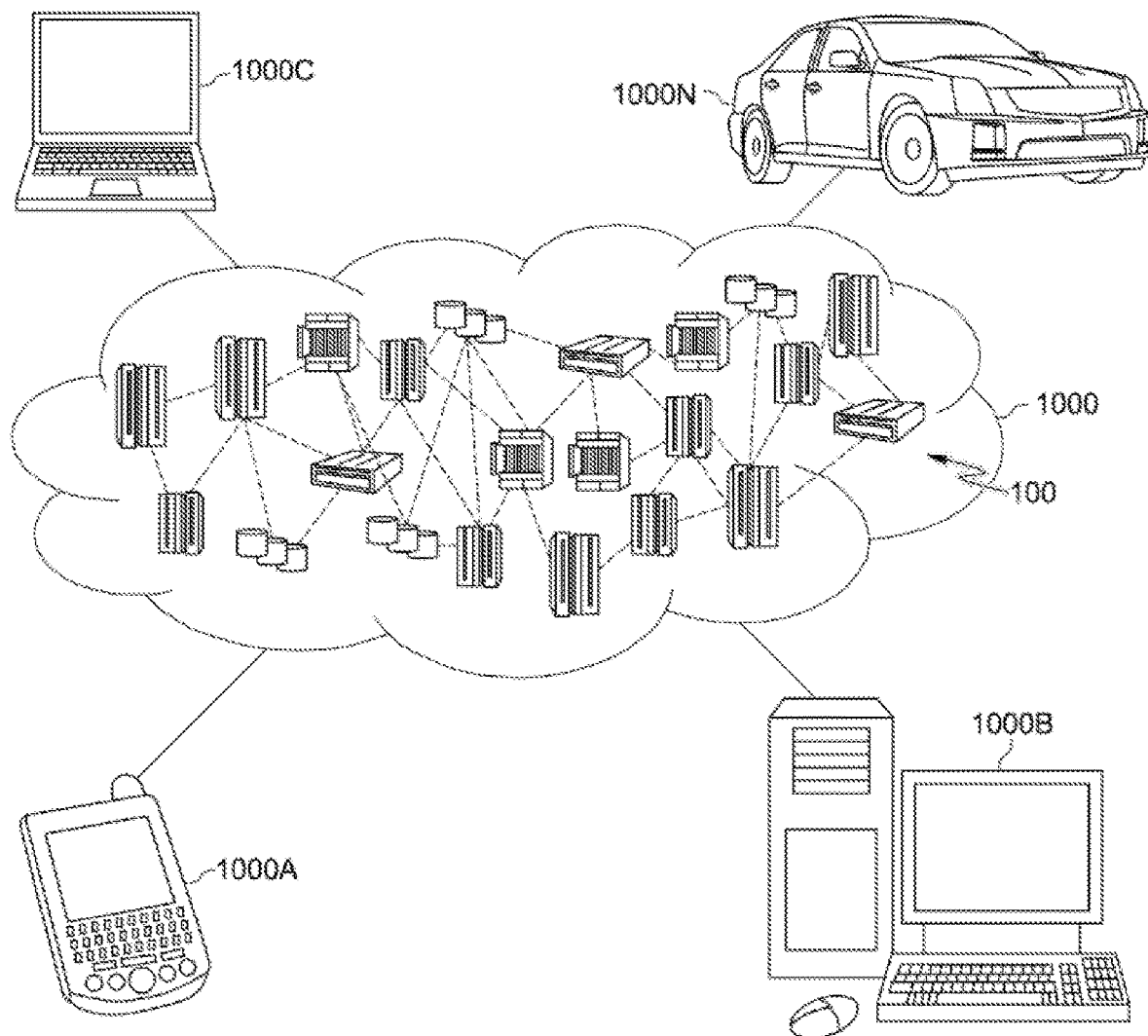
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
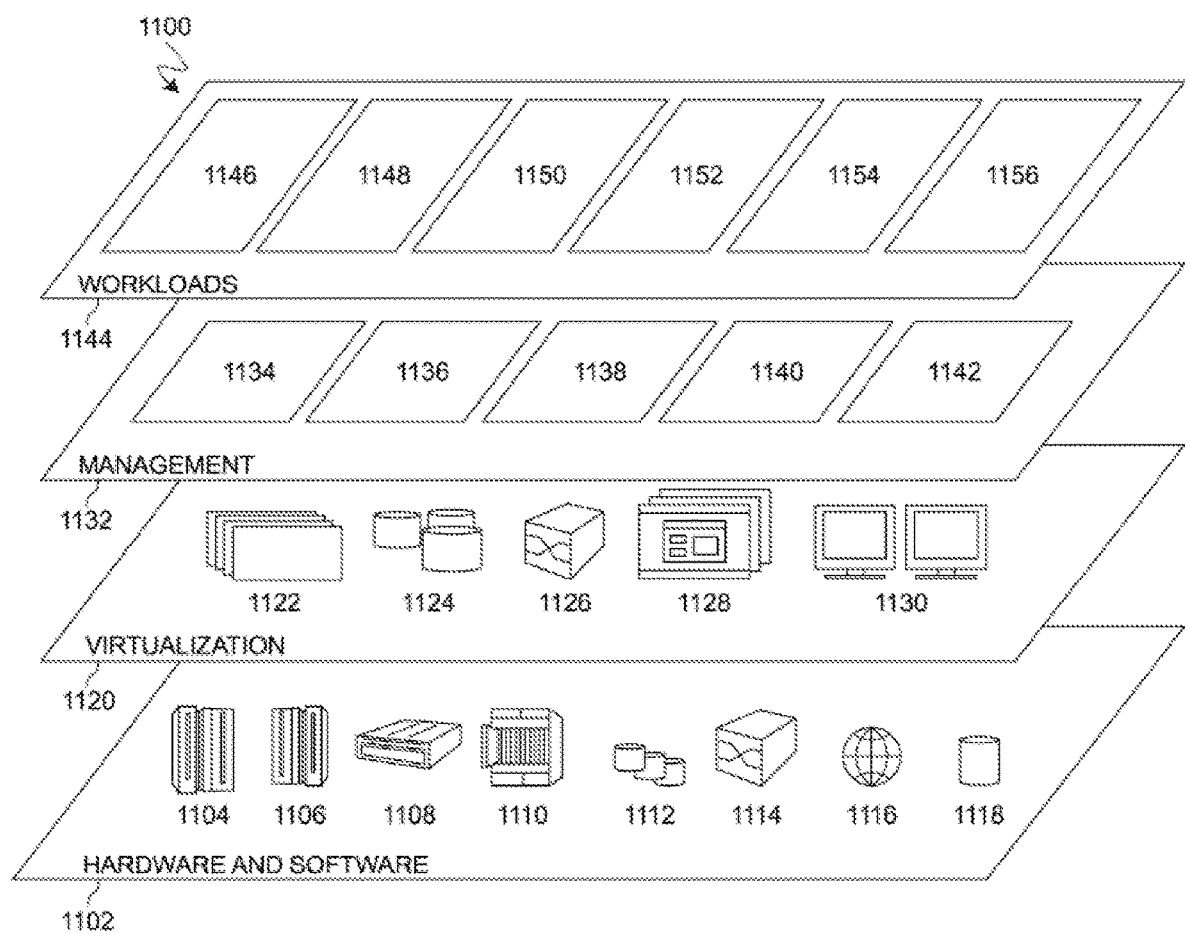
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and location tracking 1156. A power-efficient location program 110a, 110b provides a way to perform accurate location or GPS tracking while conserving the battery life of the user device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for power-efficient location tracking, the method comprising:

collecting, by a first device, at a first scheduled polling time interval of a group processing task, a first set of location data associated with a first segment mapping of a route, wherein the group processing task includes at least one second device collecting at least one second set of location data associated with at least one second segment mapping of the route at a second scheduled polling time interval of the group processing task;

storing, by the first device, the first set of location data associated with the first segment mapping of the route;

receiving, by the first device from the at least one second device, the at least one second set of location data associated with the at least one second segment mapping of the route; and mapping, by the first device, based on combining the collected first set of location data and the received at least one second set of location data, a complete route including the first segment mapping of the route and the at least one second segment mapping of the route, wherein the first scheduled polling time interval and the second scheduled polling time interval includes a polling schedule that is synchronized across the first device and the second device.

2. The method of claim 1, further comprising:

consuming, by the first device for the first segment mapping of the route, a first portion of a first device battery that is less than a second portion of the first device battery needed for mapping the complete route by the first device, wherein mapping the complete route based on combining the collected first set of location data and the received at least one second set of location data includes a combined accuracy that is at least equal to an accuracy associated with mapping the complete route by the first device.

3. The method of claim 1, further comprising:

determining, for the first device, a first individual criterion;

determining, for the at least one second device, at least one second individual criterion; and in response to the determined first individual criterion being the same as the determined at least one second individual criterion, establishing the polling schedule to evenly distribute the group processing task between the first device and the at least one second device.

4. The method of claim 1, further comprising:

determining, for the first device, a first individual criterion;

determining, for the at least one second device, at least one second individual criterion; and in response to the determined first individual criterion being different from the determined at least one second individual criterion, establishing the schedule to unevenly distribute the group processing task between the first device and the at least one second device.

5. The method of claim 1, further comprising:

determining, for the first device, a first target polling interval, wherein the first scheduled polling time interval less than the determined first target polling interval; and replacing, by the first device, a remaining set of location data associated with mapping the complete route, based on the received at least one second set of location data from the at least one second device.

6. The method of claim 1, further comprising:

collecting, by the first device, the first set of location data at the first scheduled polling time interval that is out-of-phase with the second scheduled polling time interval associated with the at least one second set of location data collected by the at least one second device.

7. The method of claim 1, wherein the group processing task further comprises:

in response to connecting the first device and the at least one second device, forming a device group to facilitate data transmission and coordination associated with performing global positioning system (GPS) tracking;

generating the polling schedule to distribute the group processing task across the formed device group, wherein the generated polling schedule is based on a number of devices in the formed device group, a first criterion of the first device, and at least one second criterion of the at least one second device; and dynamically modifying the generated polling schedule based on detecting at least one change in the number of devices in the formed device group, the first criterion of the first device, and the at least one second criterion of the at least one second device.

8. The method of claim 7, wherein the first criterion of the first device and the at least one second criterion of the at least one second device are selected from the group consisting of a GPS accuracy criterion and a battery life criterion.

9. The method of claim 7, wherein detecting the at least one change in the number of devices in the formed device group further comprises:

in response to detecting another device within a proximity of the formed device group, dynamically connecting the detected another device to actively contribute to the group processing task associated with performing GPS tracking.

10. The method of claim 7, further comprising:

in response to detecting a link breakage between the first device and the at least one second device, increasing the first scheduled polling time interval associated with the first device sharing in the group processing task for performing GPS tracking to a first target polling time interval associated with the first device individually performing GPS tracking.

11. A computer system for power-efficient location tracking, comprising:

one or more processors, One or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:

collecting, by a first device, at a first scheduled polling time interval of a group processing task, a first set of location data associated with a first segment mapping of a route, wherein the group processing task includes at least one second device collecting at least one second set of location data associated with at least one second segment mapping of the route at a second scheduled polling time interval of the group processing task;

storing, by the first device, the first set of location data associated with the first segment mapping of the route;

receiving, by the first device from the at least one second device, the at least one second set of location data associated with the at least one second segment mapping of the route; and mapping, by the first device, based on combining the collected first set of location data and the received at least one second set of location data, a complete route including the first segment mapping of the route and the at least one second segment mapping of the route, wherein the first scheduled polling time interval and the second scheduled polling time interval includes a polling schedule that is synchronized across the first device and the second device.

12. The computer system of claim 11, further comprising:

consuming, by the first device for the first segment mapping of the route, a first portion of a first device battery that is less than a second portion of the first device battery needed for mapping the complete route by the first device, wherein mapping the complete route based on combining the collected first set of location data and the received at least one second set of location data includes a combined accuracy that is at least equal to an accuracy associated with mapping the complete route by the first device.

13. The computer system of claim 11, further comprising:

determining, for the first device, a first individual criterion;

determining, for the at least one second device, at least one second individual criterion; and in response to the determined first individual criterion being the same as the determined at least one second individual criterion, establishing the polling schedule to evenly distribute the group processing task between the first device and the at least one second device.

14. The computer system of claim 11, further comprising:

determining, for the first device, a first individual criterion;

determining, for the at least one second device, at least one second individual criterion; and in response to the determined first individual criterion being different from the determined at least one second individual criterion, establishing the polling schedule to unevenly distribute the group processing task between the first device and the at least one second device.

15. The computer system of claim 11, further comprising:

determining, for the first device, a first target polling interval, wherein the first scheduled polling time interval less than the determined first target polling interval; and replacing, by the first device, a remaining set of location data associated with mapping the complete route, based on the received at least one second set of location data from the at least one second device.

16. The computer system of claim 11, further comprising:

collecting, by the first device, the first set of location data at the first scheduled polling time interval that is out-of-phase with the second scheduled polling time interval associated with the at least one second set of location data collected by the at least one second device.

17. The computer system of claim 11, wherein the group processing task further comprises:

in response to connecting the first device and the at least one second device, forming a device group to facilitate data transmission and coordination associated with performing global positioning system (GPS) tracking;

generating the polling schedule to distribute the group processing task across the formed device group, wherein the generated polling schedule is based on a number of devices in the formed device group, a first criterion of the first device, and at least one second criterion of the at least one second device; and dynamically modifying the generated polling schedule based on detecting at least one change in the number of devices in the formed device group, the first criterion of the first device, and the at least one second criterion of the at least one second device.

18. A computer program product for power-efficient location tracking, comprising:

one or more computer-readable tangible storage media and program instructions stored on at least one of the one or more computer-readable tangible storage media, the program instructions executable by a processor to cause the processor to perform a method comprising:

collecting, by a first device, at a first scheduled polling time interval of a group processing task, a first set of location data associated with a first segment mapping of a route, wherein the group processing task includes at least one second device collecting at least one second set of location data associated with at least one second segment mapping of the route at a second scheduled polling time interval of the group processing task;

storing, by the first device, the first set of location data associated with the first segment mapping of the route;

receiving, by the first device from the at least one second device, the at least one second set of location data associated with the at least one second segment mapping of the route; and mapping, by the first device, based on combining the collected first set of location data and the received at least one second set of location data, a complete route including the first segment mapping of the route and the at least one second segment mapping of the route, wherein the first scheduled polling time interval and the second scheduled polling time interval includes a polling schedule that is synchronized across the first device and the second device.

19. The computer program product of claim 18, further comprising:

consuming, by the first device for the first segment mapping of the route, a first portion of a first device battery that is less than a second portion of the first device battery needed for mapping the complete route by the first device, wherein mapping the complete route based on combining the collected first set of location data and the received at least one second set of location data includes a combined accuracy that is at least equal to an accuracy associated with mapping the complete route by the first device.

20. The computer program product of claim 18, wherein the group processing task further comprises:

in response to connecting the first device and the at least one second device, forming a device group to facilitate data transmission and coordination associated with performing global positioning system (GPS) tracking;

generating the polling schedule to distribute the group processing task across the formed device group, wherein the generated polling schedule is based on a number of devices in the formed device group, a first criterion of the first device, and at least one second criterion of the at least one second device; and dynamically modifying the generated polling schedule based on detecting at least one change in the number of devices in the formed device group, the first criterion of the first device, and the at least one second criterion of the at least one second device.

* * * * *